M. A. HOWELL, Jr.
Mole-Plow.
No. { 313, 31,317. }
Patented Feb. 5, 1861.
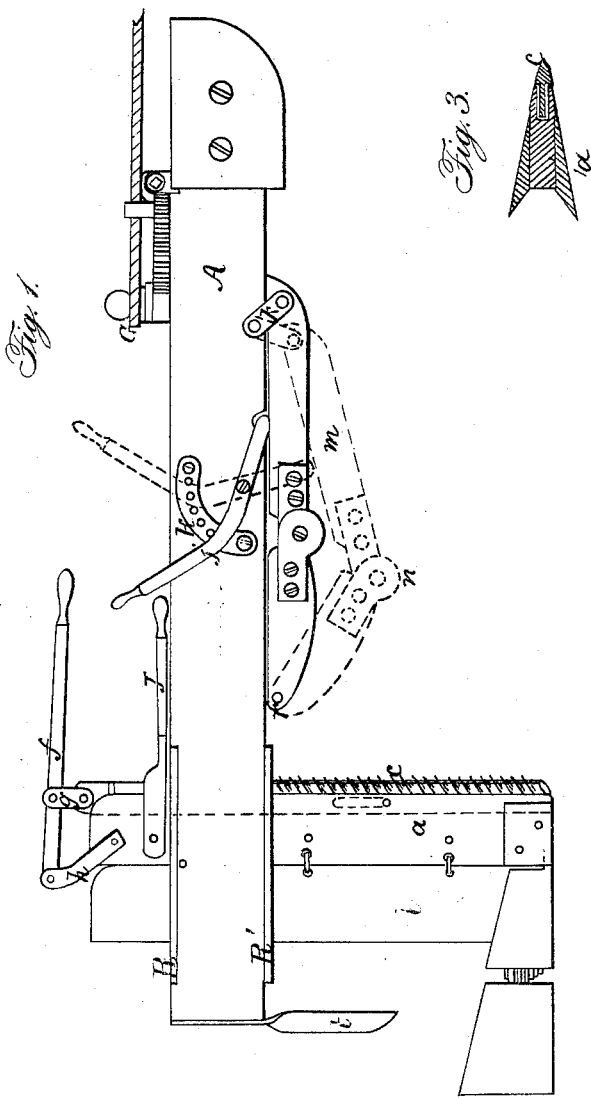
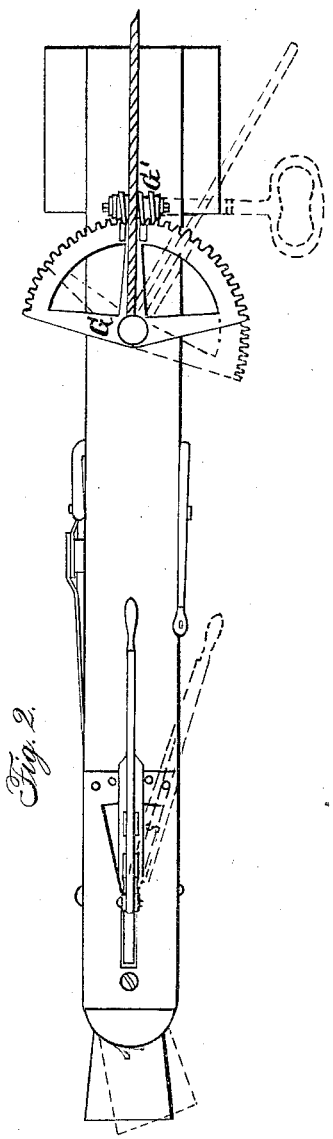
Witnesses:
O. S. Pick
Augustus Pohlers
Inventor:
Martin A. Howell Jr.

UNITED STATES PATENT OFFICE.

MARTIN A. HOWELL, JR., OF OTTAWA, ILLINOIS.

IMPROVEMENT IN MOLE-PLOWS.

Specification forming part of Letters Patent No. 31,317, dated February 5, 1861.

*To all whom it may concern:*

Be it known that I, MARTIN A. HOWELL, Jr., of Ottawa, La Salle county, and State of Illinois, have invented certain new and useful Improvements in Mole-Plows or Ditchers; and I do hereby declare that the following is a full, clear, and exact description of the same, reference being had to the accompanying drawings, making a part of this specification, in which—

Figure 1 represents a view in perspective of a plow containing my improvements, and Fig. 2 represents a plan view of such a plow; and Fig. 3 represents a sectional view of a colter with a saw or rasp annexed to its front or cutting edge.

My improvements are especially applicable to a mole-plow or ditcher such as was patented to John H. Elward by Letters Patent bearing date the 13th day of November, A. D. 1860; but they may be used on mole-plows constructed on different principles, whether they are constructed with a view to making drains in the line of a curve and without the necessity of stopping, or if they are constructed on any other principle.

The practical objections found in the use of mole-plows have been, first, that when any penetrable obstruction has been met in the line of its motion it has been necessary to stop the plow and to excavate in front of it and remove the obstruction, which circumstance has been attended with the evil of delay, and of so loosening the earth as to make it porous and liable to cave in and stop up the drain. To remedy these evils I have provided a rasp or saw to be used in connection with the edge of a cutting-colter of a mole-plow, and have provided a lever with which to work it, by the use of which any roots or other penetrable obstruction may be severed without either excavating the earth in the line of the drain or of entirely stopping the plow.

A second difficulty in the use of mole-plows has been found in the use of stationary rope guys, as in all such cases it becomes necessary to stop the plow and slacken the rope before it can be changed from one slot to any other whenever any change in the line of the drain is desired; and therefore, as this mole or ditching plow is only intended for the drainage of lands by drawing through the earth beneath the surface a mole or series of moles, leaving an arched drain, through which the water is intended to pass, and not for the purpose of displacing or removing any earth from the surface, or for purposes of cultivation, as with ordinary plows, to avoid this difficulty and at the same time to provide a rope guy of a much improved character, I have provided a movable rope guy, and have arranged it in such a manner as will permit any desired change in the direction of the plow without the necessity of stopping it or of changing the location of the power by which it is moved, and I thereby also avoid a large share of the great strain upon the beam of the plow; and, thirdly, as an improvement in the manner and in the device for changing the direction of the edge of a cutting-colter, I have provided a pivoted lever, which is pivoted to such colter and extends in front of it, and with a pin extending down from its lower side, and which may be moved to the right or left and the said pin placed in any one of a series of holes in the line of its motion, to hold such colter in any desired line of motion, the advantage of which will be perceptible in consideration of the fact that its movement may be quickly made while the plow is in motion, and that it is simple and cheap in construction. It is also superior to set-screws for this purpose, which require time in their use, besides being expensive, and soon wear out and become useless; and, fourthly, to secure a regular grade to the drain or ditch I have provided a jointed shoe and have made it fast to the under side of the beam of the plow by a hinge at one end and a swinging joint at the other, and I have also provided a pivoted lever, by use of which to operate it, and by use of which the moles of the plow may be brought to the surface of the ground whenever it may be desired; and, finally, I have provided a new device for closing the aperture cut in the earth by the colter of the plow in a knife or short colter affixed to the rear end of the beam of the plow, with its edge so arranged with respect to its line of draft as to accomplish this purpose.

My improvements therefore relating to the foregoing objects, I proceed to a more specific description of them.

In Fig. 1, the letter A represents the beam of a mole-plow containing my improvements, and with such moles as may be found in the mole-plow patented to John H. Elward.

The letter b represents what may be called a "stationary colter," and the letter a a colter whose cutting-edge may be moved from the right to the left, or otherwise, by moving the handle of the lever j in the direction in which it may be desired to turn the edge of said colter, and it may be held in any given direction by dropping a pin extending down from its lower side into any one of the holes shown in the plate R, Fig. 1, and which are shown in Fig. 2, to the extent of the slot s shown in Fig. 2.

The front edge of the cutting-colter is provided with a straight sickle, rasp, or saw, (marked c,) which in this instance is inserted in an open slot in the front edge of colter a, and by use of the lever f it may be moved rapidly up and down said slot, and thereby be used in cutting a passage for the plow through roots or other penetrable obstructions, and thereby relieve the operators from the necessity of entirely stopping the plow, and also from opening the earth to remove the obstructions, whereby the porousness of the earth is increased and the quality of the drain is diminished.

It is obvious that when a mole-plow is used in ground where there are no obstructions to be met the sickle, rasp, or saw may be substituted by a straight sharp piece of steel without teeth, which will constitute a further improvement of the drain-plow, in that it may be removed and sharpened from time to time in any well-known way.

Heavy metallic plates R R' are firmly secured to the beam of the plow, with slots in them which conform in shape and size to that marked s in the beam of the plow, and also as to make their slots correspond in position to the slot s.

In place of a stationary rope guy, as shown in the patent to John H. Elward, before mentioned, and when using which it was always necessary to stop the plow and slacken the draft-rope to change the direction of the plow, I have invented a movable rope guy, G, which may be made of metal and located as represented, and also of the shape shown in the drawings. It has appropriate teeth cut on its exterior rim, into which a stationary screw, G', works, and which may be turned by a key or any other suitable device for that purpose, and thereby a change may be given to the direction of the plow without either stopping it or changing the location of the power that gives it motion. And with the view to regulate the grade of the drain I have employed a jointed shoe, m, which is hinged to the lower side of the beam at p, and fastened to the beam at p' by a swinging joint; and I have also provided the lever j with a pin, which works into any one of the series of holes in the plate k, and said lever works against the jointed shoe m, and by use of the said lever and shoe the drain may be made deep or shallow, as may be desired, or the moles of the plow may thereby be entirely removed in the progress of the plow to the surface of the ground.

To close the aperture cut by the colter of the plow in its progress through the ground, I have affixed a short colter or knife to the rear end of the beam of the plow, the use of which I combine with the colter. It is marked t, and is placed with its side to such an angle to the line of its draft as to close the aperture made by the colter, and is regarded as being superior to wheels for this purpose.

The operation of the machine need not be stated very much in detail. It may be said, however, that the moles of the plow being placed in position and the power being applied, when a curve in the direction of the plow is desired the movable rope guy may be moved in such a direction as to secure the requisite curve without stopping the plow, and at the same time such a change in the direction of the edge of the cutting-colter may be given as will facilitate in making the desired curve also while the plow is in motion.

It is obvious that the edge of the sickle, rasp, or saw will conform to the edge of the colter to which it is annexed, and in case of the obstruction of a root or of other penetrable object it may be used, as before described, to cut a passage for the plow without removing it from the earth; and as undulations of the ground may be presented in the line of the ditch the jointed shoe m and the lever j may be used, as occasion may require, to preserve the requisite grade to the drain, and at the same time the knife or short colter at the rear end of the beam will close the drain, and thus prevent its being filled and closed.

I disclaim the use of any device heretofore known or used by which a side draft is obtained, where such device is not combined with a plow or machine for the purposes as are herein described.

What I claim as my invention, and desire to secure by Letters Patent, is—

1. In combination with a drain or mole plow, a movable sickle, rasp, or saw inserted in or annexed to a colter thereof, for the purpose set forth, and substantially as described.

2. In combination with a machine for underground draining, the application of a segmental wheel acted upon by a screw, both of which are fixed horizontally upon the beam of the machine, for the purposes of giving a curvilinear motion to the machine in contradistinction to the great power applied by a capstan.

3. In combination with a mole-plow, a jointed shoe hinged and swung to the lower side of the beam thereof, and a lever by which to control its motion, for the purpose set forth, and substantially as described.

MARTIN A. HOWELL, Jr.

Attest:
O. S. X. PECK,
AUGUSTUS TOHLERS.